US012518714B2

(12) United States Patent
Lee et al.

(10) Patent No.: US 12,518,714 B2
(45) Date of Patent: *Jan. 6, 2026

(54) LIQUID CRYSTAL DISPLAY DRIVE DEVICE AND METHOD OF DRIVING THE SAME, AND IMAGE PROCESSOR

(71) Applicant: LX SEMICON CO., LTD., Daejeon (KR)

(72) Inventors: Do Hoon Lee, Daejeon (KR); Hyun Kyu Jeon, Daejeon (KR); Ji Won Lee, Daejeon (KR); Chan Yung Kim, Daejeon (KR)

(73) Assignee: LX Semicon Co., Ltd., Daejon (KR)

( * ) Notice: Subject to any disclaimer, the term of this patent is extended or adjusted under 35 U.S.C. 154(b) by 99 days.

This patent is subject to a terminal disclaimer.

(21) Appl. No.: 18/486,955

(22) Filed: Oct. 13, 2023

(65) Prior Publication Data

US 2024/0038186 A1 Feb. 1, 2024

Related U.S. Application Data

(63) Continuation of application No. 17/550,343, filed on Dec. 14, 2021, now Pat. No. 11,830,447.

(30) Foreign Application Priority Data

Dec. 16, 2020 (KR) ........................ 10-2020-0176005

(51) Int. Cl.
*G09G 3/34* (2006.01)
*G09G 3/36* (2006.01)

(52) U.S. Cl.
CPC ......... *G09G 3/3426* (2013.01); *G09G 3/3607* (2013.01); *G09G 3/3648* (2013.01);
(Continued)

(58) Field of Classification Search
CPC .. G09G 3/3426; G09G 3/3607; G09G 3/3648; G09G 3/3406; G09G 3/32;
(Continued)

(56) References Cited

U.S. PATENT DOCUMENTS 9,214,112 B2 12/2015 Yamashita et al.
2011/0148941 A1* 6/2011 Kim .................... G09G 3/3426 345/102
(Continued)

FOREIGN PATENT DOCUMENTS

KR 10-1675840 B1 11/2016
KR 10-2018-0074407 A 7/2018
KR 10-2020-0122444 A 10/2020

*Primary Examiner* — David Tung
(74) *Attorney, Agent, or Firm* — Greenberg Traurig, LLP

(57) ABSTRACT

The present disclosure relates to a liquid crystal display drive device and a method of driving the same. An image processor of a liquid crystal display device may generate second pixel data by applying a first gain, determined according to a brightness level of each LED element, to first pixel data of each subpixel, may calculate a second gain by using a differential value obtained by differentiating the brightness level of each LED element for a location of each subpixel, and a weight and a compensation coefficient determined according to the brightness level of each LED element, generate third pixel data by applying the second gain to the second pixel data, and output the third pixel data. Various other methods, systems, and computer-readable media are also disclosed.

18 Claims, 7 Drawing Sheets

(52) U.S. Cl.
CPC ............... *G09G 2320/0242* (2013.01); *G09G 2320/0646* (2013.01); *G09G 2360/16* (2013.01)

(58) Field of Classification Search
CPC ... G09G 2320/0242; G09G 2320/0646; G09G 2320/0271; G09G 2320/062; G09G 2320/0233; G09G 2360/16
See application file for complete search history.

(56) References Cited

U.S. PATENT DOCUMENTS

| | | | | |
|---|---|---|---|---|
| 2012/0169792 | A1* | 7/2012 | Yamashita ............ | G02F 1/1336 345/690 |
| 2015/0302789 | A1* | 10/2015 | Furihata ............... | G09G 3/2007 345/694 |
| 2021/0233478 | A1* | 7/2021 | Sun .......................... | G09G 3/36 |

* cited by examiner

LIQUID CRYSTAL DISPLAY DRIVE DEVICE AND METHOD OF DRIVING THE SAME, AND IMAGE PROCESSOR

CROSS REFERENCE TO RELATED APPLICATIONS

This application is a continuation of U.S. application Ser. No. 17/550,343, filed 14 Dec. 2021, which claims the benefit of Korean Patent Application No. 10-2020-0176005, filed 16 Dec. 2020, the disclosures of each of which are incorporated, in their entirety, by this reference.

TECHNICAL FIELD

Various embodiments generally relate to a liquid crystal display drive device and a method of driving the same, capable of mitigating a step-like difference in brightness between adjacent light emitting diodes when compensating pixel data according to the brightness level of each light emitting diode.

BACKGROUND

A liquid crystal display device includes a liquid crystal panel which displays an image through a pixel matrix using electrical and optical characteristics of liquid crystal having anisotropy such as refractive index and dielectric constant, a drive circuit which drives the liquid crystal panel, and a backlight module which irradiates light to the liquid crystal panel.

An LED (light emitting diode) backlight module using an LED array as a light source has advantages of high luminance and low power consumption.

In order to reduce power consumption and improve contrast ratio, the liquid crystal display device uses a local dimming method that adjusts the brightness of the LED backlight module and compensates pixel data by the units of local dimming areas according to an input image.

Recently, a mini LED backlight module in which the number of LED elements disposed in an LED backlight module is increased by applying a mini LED element obtained by reducing the size of an LED element has been proposed.

However, with the related art in which brightness is adjusted by the unit of a local area to remove artifacts, it is difficult to anticipate a substantial effect in a liquid crystal display device using mini LEDs as an extension of local dimming.

SUMMARY

Various embodiments are directed to providing a liquid crystal display drive device and a method of driving the same, capable of mitigating a step-like difference in brightness between adjacent LEDs when compensating pixel data according to the brightness level of each LED.

In an embodiment, a liquid crystal display drive device may include a panel driver configured to drive a liquid crystal panel, a backlight driver configured to drive a backlight module including a plurality of light emitting diode (LED) elements, and an image processor configured to, according to a result of analyzing input image data of each frame, determine a brightness level of each LED element and output the determined brightness level to the backlight driver, and compensate the first pixel data of each subpixel according to the brightness level of each LED element. The image processor may generate second pixel data by applying a first gain, determined according to the brightness level of each LED element, to the first pixel data of each subpixel, may calculate a second gain by using a differential value obtained by differentiating the brightness level of each LED element for a location of each subpixel, and a weight and a compensation coefficient determined according to the brightness level of each LED element, generate by applying the second gain to the second pixel data, and output third pixel data to the panel driver.

The image processor may include: an image analyzer configured to divide the input image data of each frame into the plurality of unit areas, and output an image analysis result of each unit area obtained by analyzing image characteristics of each of the plurality of unit areas; an LED brightness level determiner configured to determine and output the brightness level of each LED element corresponding to each unit area according to the image analysis result of each unit area; and a pixel data compensator configured to determine the first gain and the second gain according to the brightness level of each LED element, generate the second pixel data by applying the first gain to the first pixel data of each subpixel, and generate the third pixel data by applying the second gain as an offset value to the second pixel data.

The pixel data compensator may determine an LED brightness level of each of the plurality of subpixels by applying the brightness level of each LED element to each unit area. The pixel data compensator may calculate the differential value of the LED brightness level for the location of each subpixel, by convoluting the LED brightness level of each of the plurality of subpixels and a plurality of mask coefficients of a Gaussian Laplacian mask.

The pixel data compensator may calculate an amount of change in LED brightness level for each location with respect to adjacent subpixels at the location of each subpixel, as the differential value, by convoluting the mask coefficients of an N*N size (N is a positive integer) and the LED brightness level of each of subpixels of the N*N size.

In an embodiment, a method of driving a liquid crystal display drive device may include: dividing input image data of each frame including first pixel data of each of a plurality of subpixels of a liquid crystal panel, into a plurality of unit areas corresponding to a plurality of LED elements, respectively, of a backlight module, and outputting an image analysis result of each of the plurality of unit areas, in an image processor; determining and outputting a brightness level of each LED element according to the image analysis result of each unit area, in the image processor; generating second pixel data by applying a first gain, determined according to the brightness level of each LED element, to the first pixel data of each subpixel, in the image processor; calculating a second gain by using a differential value obtained by differentiating the brightness level of each LED element for a location of each subpixel and a weight and a compensation coefficient determined according to the brightness level of each LED element, in the image processor; and generating third pixel data by applying the second gain to the second pixel data and outputting third pixel data, in the image processor.

In an embodiment, an image processor may be configured to, according to a result of analyzing input image data of each frame including first pixel data of each of a plurality of subpixels of a liquid crystal panel by dividing the input image data into a plurality of unit areas corresponding to a plurality of LED elements, respectively, of a backlight module, determine and output a brightness level of each LED element, and generate second pixel data by applying a first gain, determined according to the brightness level of each LED element, to the first pixel data of each subpixel. The image processor may calculate a second gain by using a differential value obtained by differentiating the brightness level of each LED element for a location of each subpixel and a weight and a compensation coefficient determined according to the brightness level of each LED element. The image processor may generate third pixel data by applying the second gain to the second pixel data and output the third pixel data.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
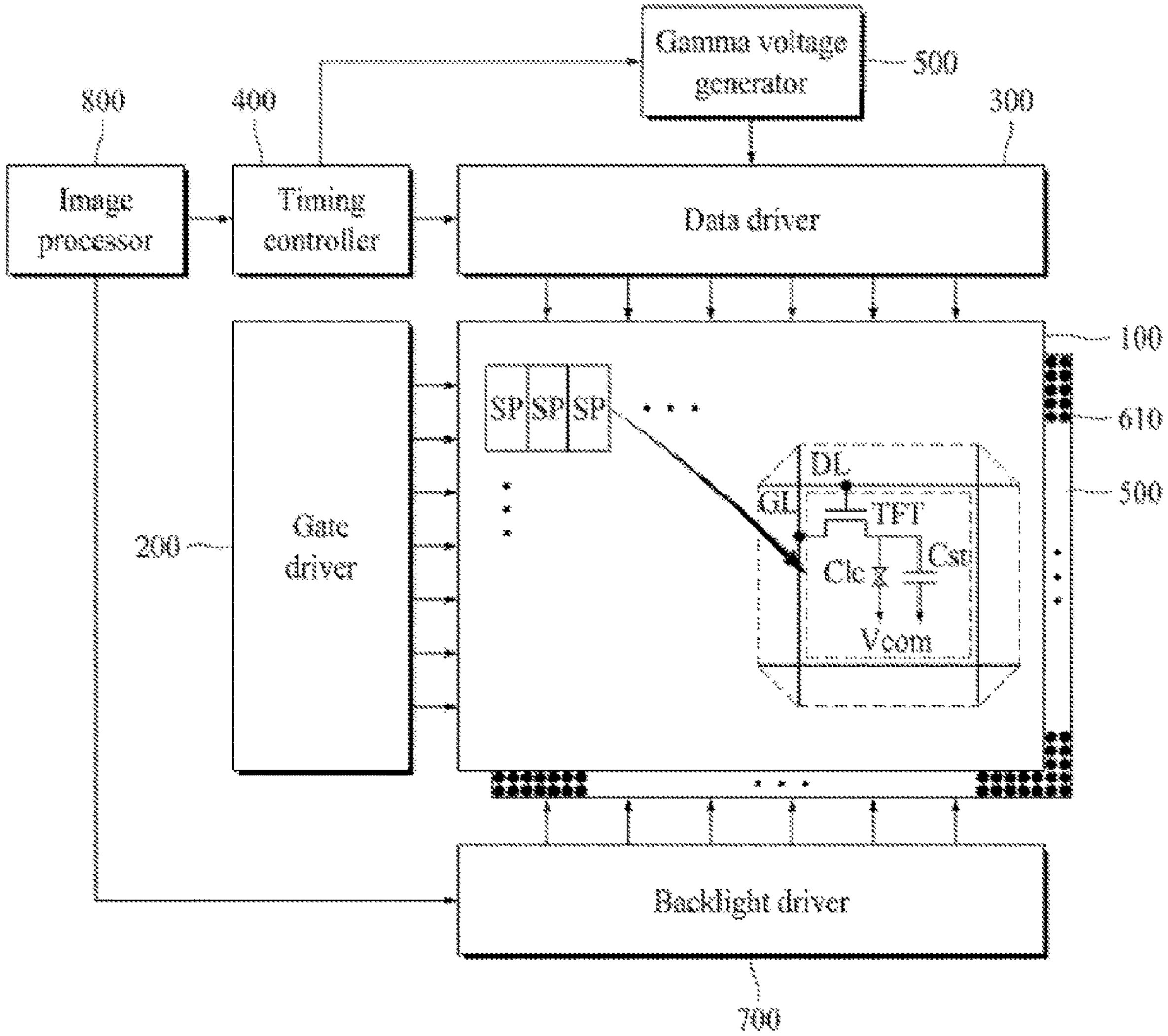
FIG. 1 is a block diagram illustrating the configuration of a liquid crystal display device in accordance with an embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where “comprise,” “have,” and “include” described in the present specification are used, another part may be added unless “only” is used. The terms of a singular form may include plural forms unless referred to the contrary.

In construing an element, the element is construed as including an error range although there is no explicit description.

In describing a position relationship, for example, when a position relation between two parts is described as “on,” “over,” “under,” and “next,” one or more other parts may be disposed between the two parts unless a more limiting term, such as “just” or “direct(ly)” is used.

In describing a time relationship, for example, when the temporal order is described as, for example, “after,” “subsequent,” “next,” and “before,” a case which is not continuous may be included unless a more limiting term, such as “just,” “immediate(ly),” or “direct(ly)” is used.

It will be understood that, although the terms “first,” “second,” etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms “first,” “second,” “A,” “B,” “(a),” “(b),” etc., may be used. These terms are intended to identify the corresponding elements from the other elements, and basis, order, or number of the corresponding elements should not be limited by these terms. The expression that an element is “connected,” “coupled,” or “adhered” to another element or layer, the element or layer can not only be directly connected or adhered to another element or layer, but also be indirectly connected or adhered to another element or layer with one or more intervening elements or layers “disposed” between the elements or layers, unless otherwise specified.

The term “at least one” should be understood as including any and all combinations of one or more among the associated listed elements. For example, the meaning of “at least one or more of a first element, a second element, and a third element” denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, various embodiments of the present disclosure will be described in detail with reference to the accompanying drawings.

FIG. 1 is a block diagram illustrating the configuration of a liquid crystal display device in accordance with an embodiment.

Referring to FIG. 1, the liquid crystal display device may include a liquid crystal panel 100, a gate driver 200, a data driver 300, a timing controller 400, a gamma voltage generator 500, a backlight module 600, a backlight driver 700 and an image processor 800. The gate driver 200 and the data driver 300 may be defined as a panel driver. The gate driver 200, the data driver 300 and the timing controller 400 may be defined as a display driver.

The liquid crystal panel 100 may include a first substrate in which a thin film transistor (TFT) array is disposed, a second substrate in which a color filter array is disposed, a liquid crystal layer which is disposed between the first and second substrates bonded by a sealant, and polarizing plates which are attached to the outer surfaces of the first and second substrates, respectively.

The liquid crystal panel 100 displays an image through a display area in which subpixels SP are arranged in the form of a matrix. Each subpixel SP may be any one of a red subpixel emitting red light, a green subpixel emitting green light, a blue subpixel emitting blue light and a white subpixel emitting white light, and may be independently driven by each TFT. A unit pixel may be configured by a combination of two, three or four subpixels having different colors.

Each subpixel SP may include a TFT which is connected to a gate line GL and a data line DL, and a liquid crystal capacitor Clc and a storage capacitor Cst which are connected in parallel between a pixel electrode connected to the TFT and a common electrode.

In each subpixel SP, the gate electrode of the TFT is connected to the gate driver 200 through the gate line GL which is disposed in the liquid crystal panel 100, and any one input electrode of the source electrode and the drain electrode of the TFT is connected to the data driver 300 through the data line DL which is disposed in the liquid crystal panel 100. While the TFT is turned on in response to a scan pulse having a gate on voltage supplied through the corresponding gate line GL from the gate driver 200, the liquid crystal capacitor Clc and the storage capacitor Cst of each subpixel SP may be supplied with, through the turned-on TFT, a data signal supplied through the corresponding data line DL from the data driver 300, and thereby, may charge a difference voltage between the data signal supplied to the pixel electrode and a common voltage Vcom supplied to the common electrode, as a pixel voltage.

Each subpixel SP may drive liquid crystal according to the charged pixel voltage to change the alignment direction of the liquid crystal, thereby adjusting the transmittance of light transmitted through the liquid crystal panel 100 and the polarizing plates from the mini LED backlight module 600. Each subpixel SP may express a desired grayscale of an input image by the product of the brightness of the mini LED backlight module 600 and the light transmittance controlled according to the data signal in each subpixel SP.

The liquid crystal panel 100 may further include a touch sensor screen which overlaps with a display area as a whole to sense a user's touch, and the touch sensor screen may be embedded in the liquid crystal panel 100 or be disposed on the display area of the liquid crystal panel 100.

The backlight module 600 may include, as a light source, a mini LED array 610 which faces the backside of the liquid crystal panel 100, and thereby, may be configured as a direct-lit mini LED backlight module which is disposed on a bottom substrate. The backlight module 600 may include the mini LED array 610 in which a plurality of mini LEDs are disposed in the form of a matrix to face the display area, as a whole, of the liquid crystal panel 100, and a plurality of optical sheets which are stacked on the mini LED array 610 to improve light efficiency.

The mini LED array 610 may have a structure in which a larger number of mini LED elements are densely arranged because the chip size of each mini LED element is small. For example, the chip size of the mini LED element may be as small as 100-200 μm. The mini LED array 610 may include several thousands to several tens of thousands of mini LED elements as compared to an LED backlight according to a related art which includes several hundreds of LED elements. Since the mini LED array 610 has a resolution smaller than the pixel resolution of the liquid crystal panel 100, each mini LED element may provide light in correspondence to a unit area including a plurality of subpixels SP.

In the mini LED array 610, each mini LED element may be independently driven by the backlight driver 700. Each mini LED element may provide light whose brightness is individually adjusted, to the plurality of subpixels SP belonging to each unit area.

The backlight driver 700 may receive the brightness level of each mini LED element determined by the image processor 800, and may control the brightness of each mini LED element by supplying a driving signal according to the brightness level to each mini LED element of the mini LED array 610.

Accordingly, since the liquid crystal display device using the mini LED backlight module 600 may adjust brightness for each mini LED element, it is possible to increase image quality and contrast ratio by clearly expressing a black color compared to the local dimming method according to the related art.

The gate driver 200 may be controlled according to a plurality of gate control signals received from the timing controller 400 to individually drive the gate lines GL of the liquid crystal panel 100. The gate driver 200 may sequentially drive the plurality of gate lines GL. The gate driver 200 may supply a scan signal having a gate on voltage to each gate line GL during the driving period of the corresponding gate line GL, and may supply a gate off voltage to each gate line GL during the non-driving period of the corresponding gate line GL.

The gate driver 200 may be configured by at least one gate driving IC (integrated circuit). The gate driver 200 may be mounted on a circuit film such as a tape carrier package (TCP), a chip on film (COF) and a flexible printed circuit (FPC) to be attached to the liquid crystal panel 100 by tape automated bonding (TAB) or be mounted on the liquid crystal panel 100 by chip on glass (COG). Unlike this, the gate driver 200 may be formed on a TFT substrate together with the TFT of each subpixel SP of the liquid crystal panel 100 to be embedded in a bezel area of the liquid crystal panel 100.

The data driver 300 is controlled according to a data control signal received from the timing controller 400, may convert digital pixel data received from the timing controller 400 into an analog data signal, and may supply a data signal to each of the data lines DL of the liquid crystal panel 100. The data driver 300 may convert the digital pixel data into the analog data signal by using grayscale voltages which are generated as a plurality of reference gamma voltages supplied from the gamma voltage generator 500 are segmented.

The data driver 300 may be configured by at least one data driving IC. The data driver 300 may be mounted on a circuit film such as a TCP, a COF and an FPC to be attached to the liquid crystal panel 100 by TAB or be mounted on the bezel area of the liquid crystal panel 100 by COG.

The gamma voltage generator 500 may generate a reference gamma voltage set including a plurality of reference gamma voltages having different voltage levels and supply the reference gamma voltage set to the data driver 300. The gamma voltage generator 500 may generate the plurality of reference gamma voltages corresponding to the gamma characteristics of the display device under the control of the timing controller 400 and supply the plurality of reference gamma voltages to the data driver 300. The gamma voltage generator 500 may be configured by a programmable gamma IC. The gamma voltage generator 500 may receive gamma data from the timing controller 400, may generate or adjust reference gamma voltage levels according to the gamma data, and may output the generated or adjusted reference gamma voltage levels to the data driver 300.

The timing controller 400 may receive pixel data compensation-processed by the image processor 800 and synchronization signals. The synchronization signals may include a dot clock, a data enable signal, a vertical synchronization signal, a horizontal synchronization signal, etc.

The timing controller 400 may perform overdriving processing in which an overshoot value or an undershoot value according to the difference in pixel data between adjacent frames is added to each pixel data to modulate each pixel data so as to improve the response speed of the liquid crystal, and may supply the modulated pixel data to the data driver 300.

By using the received synchronization signals and timing setting information (start timing, pulse width, etc.) stored in an internal register, the timing controller 400 may generate a plurality of data control signals and supply the plurality of data control signals to the data driver 300, and may generate a plurality of gate control signals and supply the plurality of gate control signals to the gate driver 200.

The image processor 800 may determine the brightness level of each LED element for controlling the brightness of each LED element according to input image data, and may compensate pixel data to be supplied to each subpixel SP, by reflecting the determined brightness level of each LED element. The image processor 800 may output the brightness level of each LED element to the backlight driver 700, and may output compensated pixel data to the timing controller 400.

The image processor 800 may be embedded in the timing controller 400, or the image processor 800, the timing controller 400 and the data driver 300 may be integrated into an integrated IC. Alternatively, the image processor 800 may be embedded in a system on chip (SoC) of a host system. For example, the host system may be any one of a computer, a TV system, a set-top box and a system of a portable terminal such as a ablet or a mobile phone.

The image processor 800 may divide the input image data of each frame including pixel data of respective subpixels into a plurality of unit areas to analyze image characteristics for each unit area.

The image processor 800 may determine the brightness level of each mini LED element corresponding to each unit area according to an image analysis result for each unit area, and may output the determined brightness level of each mini LED element to the backlight driver 700.

The image processor 800 may calculate a first gain, having an inversely proportional relationship with an LED brightness level, by using the determined brightness level of each mini LED element, and may primarily compensate each pixel data by applying the calculated first gain.

In particular, the image processor 800 may differentiate the brightness level of the mini LED element for each subpixel location, and thereby, may calculate a differential value of the LED brightness level for the location of each subpixel, that is, an amount of change in LED brightness level between adjacent subpixels. Also, the image processor 800 may calculate a second gain by applying weights $\alpha$ and $\beta$ set according to the LED brightness level to the differential value of the LED brightness level for each subpixel. Detailed description for this will be made later.

The image processor 800 may secondarily compensate the primarily compensated pixel data by applying the calculated second gain to the primarily compensated pixel data, and may output output image data including the secondarily compensated pixel data to the timing controller 400. The timing controller 400 having the image processor 800 embedded therein may output the output image data of the image processor 800 to the data driver 300.

As described above, the liquid crystal display device in accordance with the embodiment may determine the brightness level of each mini LED by reflecting an image analysis result, and when compensating each pixel data according to the determined brightness level of each mini LED, may additionally reflect an amount of change in LED brightness level between adjacent subpixels and weights according to the LED brightness level, thereby mitigating a step-like difference in brightness between adjacent mini LEDs and improving the image quality.

Figure 2:
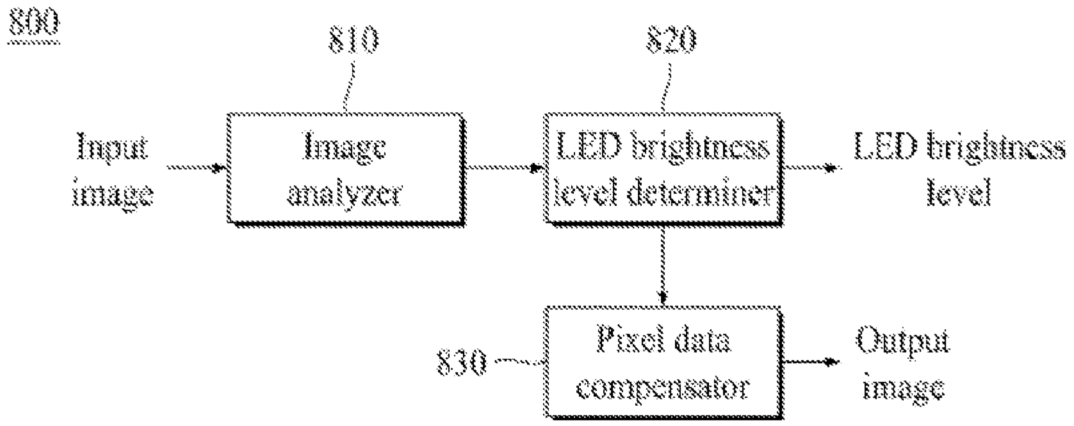
FIG. 2 is a block diagram illustrating the configuration of an image processor in the liquid crystal display device in accordance with the embodiment of the present disclosure.
Figure 3:
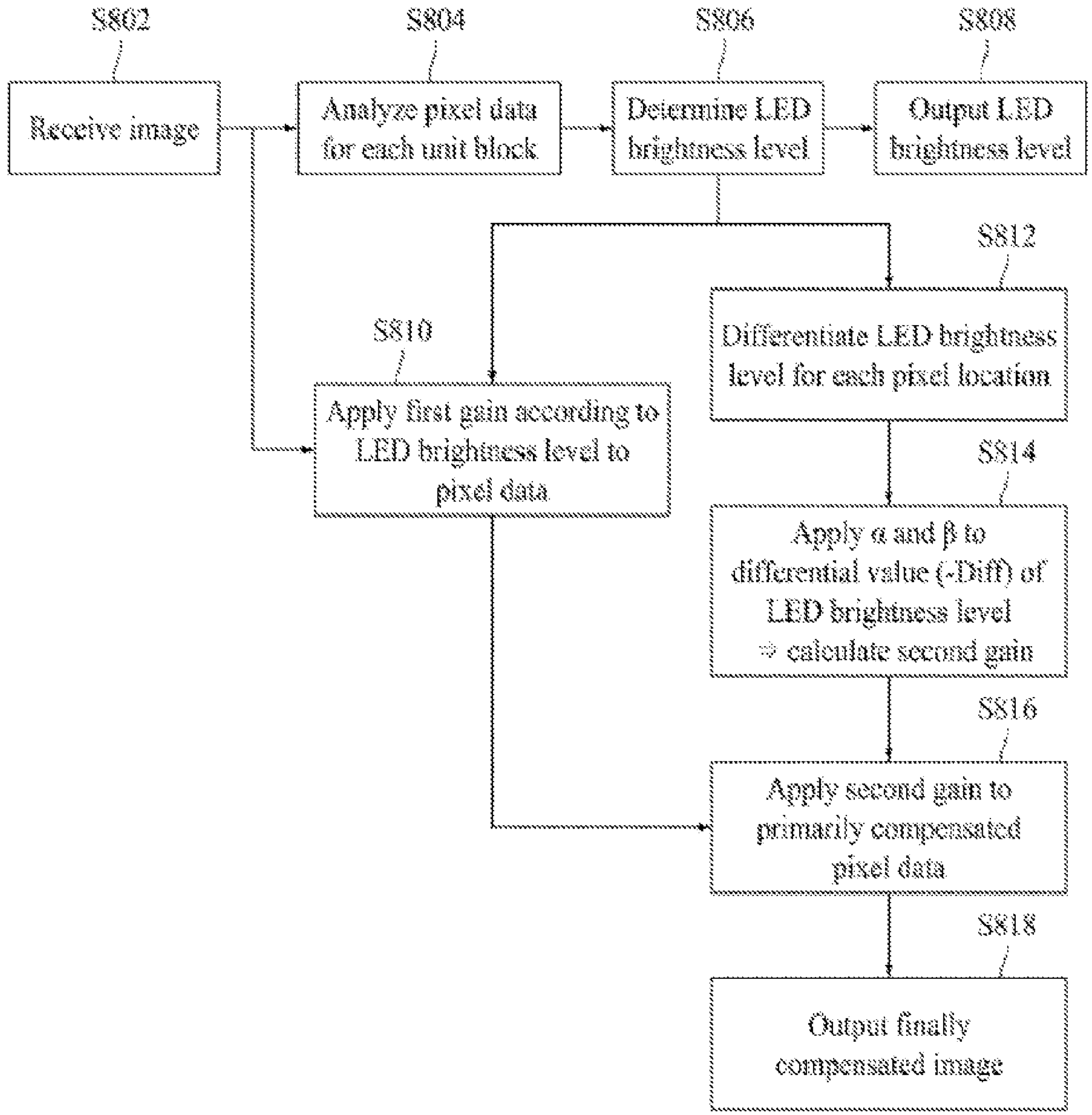
FIG. 3 is a flowchart illustrating a method of driving the image processor in the liquid crystal display device in accordance with the embodiment.
Figure 4:
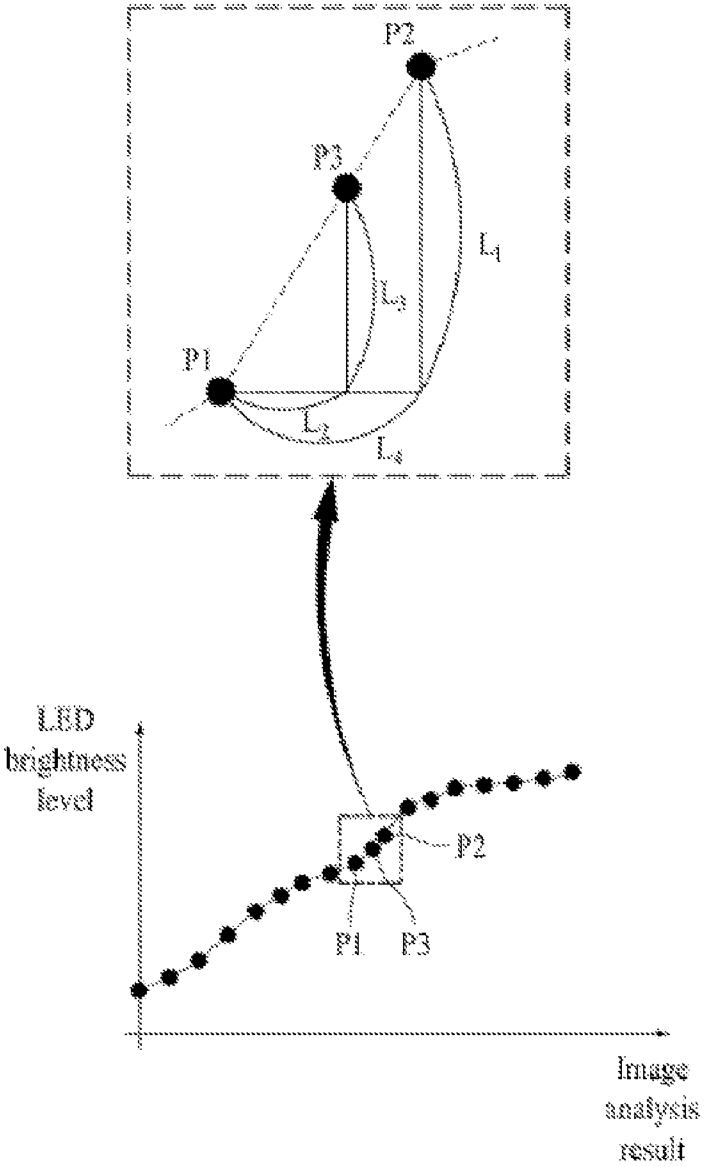
FIG. 4 is a graph illustrating the relationship of an LED brightness level according to an image analysis result in accordance with the embodiment.
Figure 5:
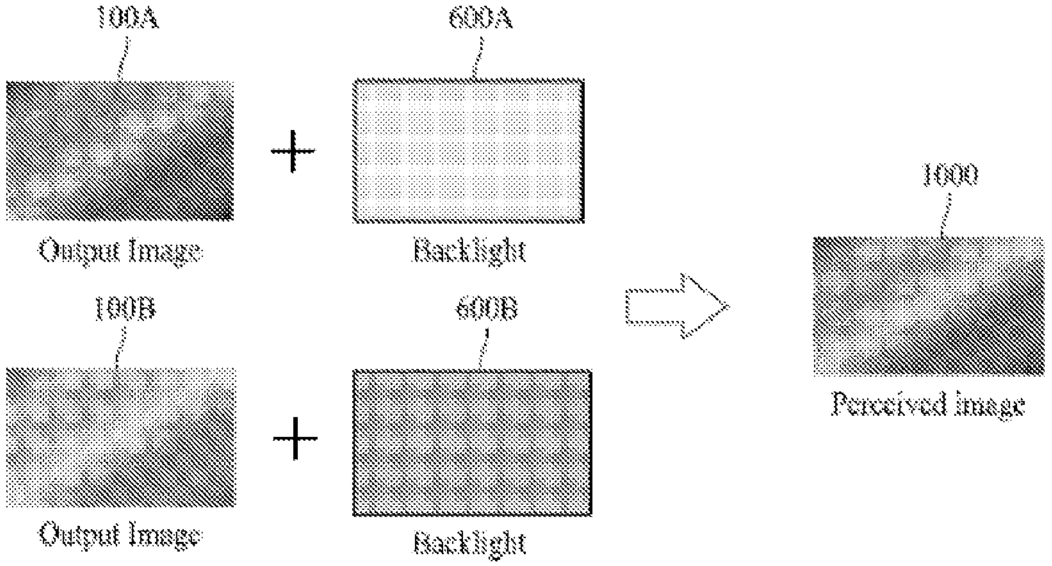
FIG. 5 is a diagram for explaining a perceived image of the same luminance according to a liquid crystal panel and the brightness of a backlight in the liquid crystal display device in accordance with the embodiment.
Figure 6:
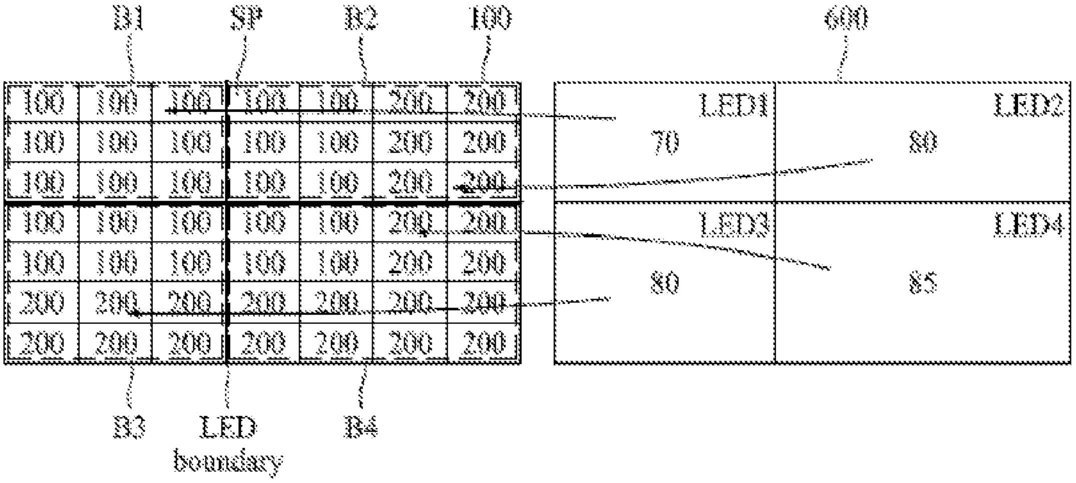
FIG. 6 is a diagram for explaining a method of differentiating an LED brightness level in the image processor in accordance with the embodiment.

FIG. 2 is a block diagram illustrating the configuration of an image processor in the liquid crystal display device in accordance with the embodiment of the present disclosure, and FIG. 3 is a flowchart illustrating a method of driving the image processor in the liquid crystal display device in accordance with the embodiment. FIG. 4 is a graph illustrating the relationship of an LED brightness level according to an image analysis result in accordance with the embodiment, FIG. 5 is a diagram for explaining a perceived image of the same luminance according to a liquid crystal panel and the brightness of a backlight in the liquid crystal display device in accordance with the embodiment, and FIG. 6 is a diagram for explaining a method of differentiating an LED brightness level in the image processor in accordance with the embodiment.

Referring to FIG. 2, the image processor 800 may include an image analyzer 810, an LED brightness level determiner 820 and a pixel data compensator 830.

The method of driving the image processor shown in FIG. 3 may be performed by the image analyzer 810, the LED brightness level determiner 820 and the pixel data compensator 830 of the image processor 800 illustrated in FIG. 2.

Referring to FIGS. 2 and 3, in the image processor 800, the image analyzer 810 may receive an input image of each frame (S802), and may divide the input image of each frame into a plurality of unit areas, analyze image characteristics for each unit area and output an image analysis result for each unit area (S804). Each unit area may include a plurality of pixel data to be supplied to a plurality of subpixels corresponding to each mini LED element of the backlight module 600.

For example, the image analyzer 810 may calculate an average value or a maximum value of the plurality of pixel data included in each unit area, and, thereby, may output an image analysis result of each unit area, that is, a representative value of each unit area. Meanwhile, the image analyzer 810 may calculate a distribution of the plurality of pixel data included in each unit area, by using histogram analysis, and may output an image analysis result of each unit area according to the distribution of the pixel data.

In the image processor 800, the LED brightness level determiner 820 may determine the brightness level of each mini LED element corresponding to each unit area according to the image analysis result for each unit area supplied from the image analyzer 810 (S806).

For example, in the image processor 800, the brightness level of the mini LED element corresponding to the image analysis result for each unit area may be set in advance, and may be stored in the form of a lookup table (LUT). The LED brightness level determiner 820 may select, in the LUT, and output the brightness level of each mini LED element corresponding to the image analysis result of each unit area.

The LED brightness level determiner 820 may determine the brightness level of each mini LED element corresponding to the image analysis result for each unit area, by using a function for calculating the brightness level of the mini LED element according to the image analysis result for each unit area.

Unlike this, as shown in FIG. 4, a plurality of LED brightness levels corresponding to a plurality of image analysis results may be sampled and stored in the LUT of the image processor 800, and the LED brightness level determiner 820 may determine a brightness level not stored in the LUT, by interpolating adjacent LED brightness levels.

Referring to FIG. 4, the LED brightness level determiner 820 may determine a brightness level L3 of a third point P3 not stored in the LUT, by performing linear interpolation as in Equation 1 below by using the brightness level of a first point P1 and the brightness level of a second point P2 stored in the LUT.

$$L1=Y_{Pn+1}-Y_{Pn}$$

$$L2=X_k-X_{Pn}$$

$$L4=X_{Pn+1}-X_{Pn}$$

$$L1\times L2 \qquad \text{Equation 1}$$

In Equation 1, L1 means the difference between an LED brightness level YPn+1 of the second point P2 and an LED brightness level YPn of the first point P1, L2 means the difference between an image analysis result Xk of the third point P3 and an image analysis result XPn of the first point P1, L4 means the difference between an image analysis result XPn+1 of the second point P2 and the image analysis result XPn of the first point P1, and L3 means the LED brightness level of the third point P3 calculated through interpolation.

The LED brightness level determiner 820 may output the brightness level of each mini LED element determined according to the image analysis result for each unit area, to the backlight driver 700 (S808) and to the pixel data compensator 830.

The pixel data compensator 830 may calculate a first gain according to the brightness level of each mini LED element supplied from the LED brightness level determiner 820, and may primarily compensate each pixel data by applying the calculated first gain to each pixel data (S810).

The pixel data compensator 830 may calculate a first gain having an inversely proportional relationship with an LED brightness level, by using the brightness level of each mini LED element.

For example, the pixel data compensator 830 may calculate a first gain (−Gain) which is inversely proportional to the brightness level (LED level) of each mini LED element, by using a linear function (−Gain=100/LED level), a non-linear curve function or a measurement-based function, and may primarily compensate each pixel data Pix of a unit area by applying the calculated first gain (−Gain) to each pixel data Pix (Gained Pix=−Gain*Pix).

Referring to FIG. 5, when the brightness of a backlight module 600A is high, an output image supplied to a liquid crystal panel 100A is compensated so that a luminance decreases, and a viewer may view a perceived image 1000 according to the combination of the brightness of the backlight module 600A and a light transmittance according to an image outputted to the liquid crystal panel 100A.

On the other hand, when the brightness of a backlight module 600B is low, an output image supplied to a liquid crystal panel 100B is compensated so that a luminance increases, and a viewer may view the perceived image 1000 according to the combination of the brightness of the backlight module 600B and a light transmittance according to an image outputted to the liquid crystal panel 100B.

The pixel data compensator 830 may differentiate the brightness level of the mini LED element for each subpixel location using the brightness level of each mini LED element, and thereby, may calculate a differential value of the LED brightness level for each subpixel, that is, an amount of change in LED brightness level between adjacent subpixels, for the location of each subpixel (S812).

For example, as shown in FIG. 6, the liquid crystal panel 100 may be divided into first to fourth unit areas B1 to B4 corresponding to first to fourth mini LEDs LED1 to LED4, respectively, and each of the unit areas B1 to B4 may include a plurality of subpixels SP.

By applying a first LED brightness level 70 to the first area B1, applying a second LED brightness level 80 to the second area B2, applying a third LED brightness level 80 to the third area B3 and applying a fourth LED brightness level 85 to the fourth area B4, the pixel data compensator 830 may determine an LED brightness level for the location of each of the subpixels SP of the first to fourth unit areas B1 to B4.

By performing convolution through applying a Laplacian of Gaussian (LoG) mask of an N*N size (N is a positive integer), for example, the following Laplacian mask coefficients of a 3*3 size, to the LED brightness level determined for the location of each subpixel SP, the pixel data compensator 830 may differentiate the brightness level of the mini LED element for each subpixel location, and thereby, may calculate an amount of change of each subpixel in LED brightness level with respect to adjacent subpixels, as a differential value of the LED brightness level for each subpixel. Accordingly, an amount of change in LED brightness level with respect to adjacent subpixels at the location of each subpixel located at the boundary of the mini LED element may be calculated as a differential value.

$$\begin{bmatrix} -1 & -1 & -1 \\ -1 & 8 & -1 \\ -1 & -1 & -1 \end{bmatrix}$$

< Laplacian of Gaussian >

By summing all results of applying (multiplying) a central coefficient 8 of the Laplacian mask to the LED brightness level of a target subpixel for which a differential value is to be calculated among the LED brightness levels of the 3*3 subpixels and applying (multiplying) a remaining coefficient −1 to each of the LED brightness levels of eight adjacent subpixels adjacent to the target subpixel in vertical, horizontal and diagonal directions, the differential value of the LED brightness level of the location of the target subpixel may be calculated. By convoluting the LED brightness levels of the 3*3 subpixels and the 3*3 Laplacian mask coefficients while shifting the Laplacian mask in the unit of one subpixel, an amount of change in LED brightness level as a differential value of an LED brightness level for each subpixel location may be calculated.

The pixel data compensator 830 may calculate a second gain by applying a weight a and a compensation coefficient 13 according to an LED brightness level, to a differential value (−Diff) of the LED brightness level of each subpixel (S814).

First, the pixel data compensator 830 may determine the weight a set in advance according to the LED brightness level and the compensation coefficient 13 for compensating for a deviation between the LED brightness level and a measured luminance. Then, the pixel data compensator 830 may calculate the second gain (a*−Diff+13) by applying the weight a and the compensation coefficient 13 determined according to the LED brightness level, to the differential value (−Diff) of the LED brightness level of each subpixel.

The weight $\alpha$ according to the LED brightness level may be calculated by using the brightness level (LED level) of each LED element to be inversely proportional to the brightness level (LED level) of each LED element.

Figure 7:
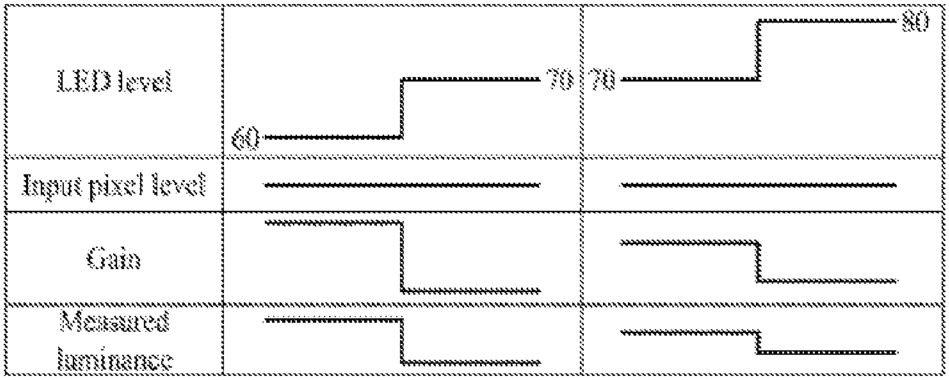
FIG. 7 is a diagram for explaining a weight applied to the image processor in accordance with the embodiment.

Referring to FIG. 7, since the first gain (Gain) to be applied to input pixel data (Input pixel level) increases as the LED brightness level (LED level) is low, it may be seen that, when the LED brightness level (LED level) is low in a measured luminance of the liquid crystal display device, a stepping phenomenon is prominent as compared to when the LED brightness level (LED level) is high.

In order to mitigate such a stepping phenomenon according to the LED brightness level, a weight ($\alpha$=Const./LED level, Const. is a constant) that is a reciprocal of the LED brightness level may be calculated, and may be applied ($\alpha*-$Diff) to the differential value (−Diff) of the LED brightness level of each subpixel. Meanwhile, the weight $\alpha$ according to the LED brightness level is not limited to the above-described reciprocal of the LED brightness level, and may be changed according to an equation for calculating the first gain (Gain) to be applied to the input pixel data (Input pixel level).

The compensation coefficient $\beta$ for compensating for a deviation between the LED brightness level and a measured luminance may be determined according to the brightness level of each mini LED element.

Figure 8A:
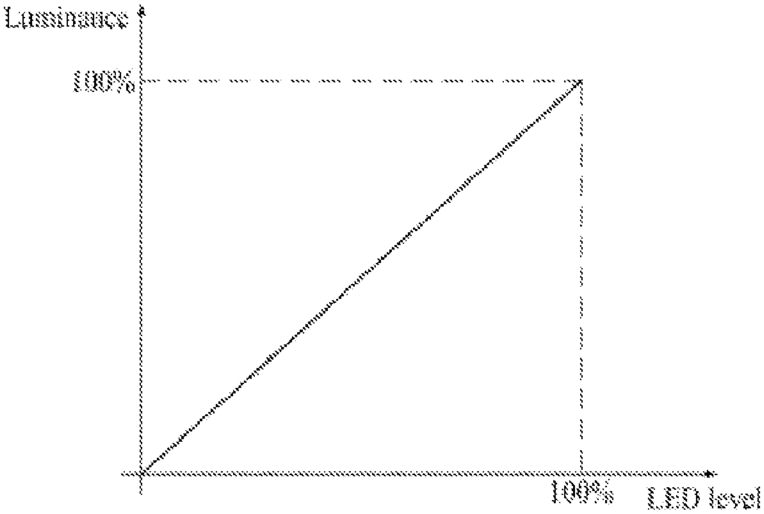
FIGS. 8A and 8B are graphs for explaining a compensation coefficient applied to the image processor in accordance with the embodiment.
Figure 8B:
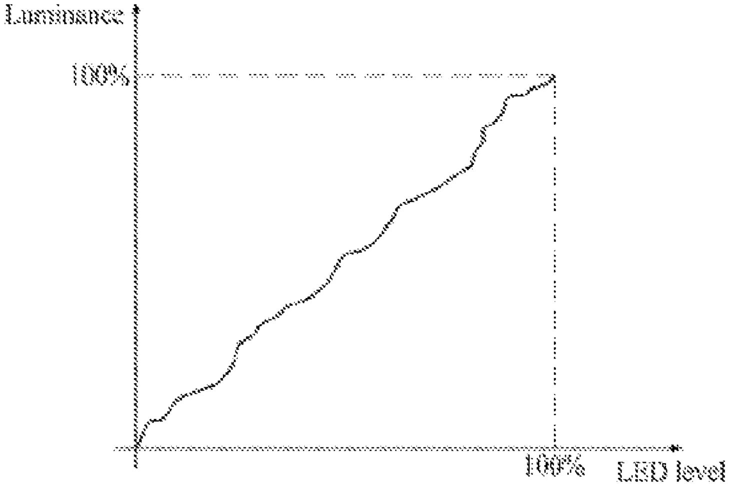

Referring to FIG. 8A, ideally, an LED brightness level (LED level) and the luminance of a liquid crystal panel are proportional. However, it may be seen that, as shown in FIG. 8B, a measured luminance nonlinearly and finely varies although it shows a proportional trend. The reason why an LED brightness level (LED level) and the luminance of a liquid crystal panel are nonlinearly proportional as shown in FIG. 8B resides in that various factors such as the light transmittance, process deviation, etc. of the liquid crystal panel 100 are mixed.

In order to mitigate the nonlinear relationship between an LED brightness level (LED level) and a measured luminance, the compensation coefficient $\beta$ according to the LED brightness level may be set in advance and be stored in the image processor 800 in the form of an LUT, or compensation coefficients $\beta$ according to a plurality of LED brightness levels (LED levels) may be sampled and stored in an LUT.

The pixel data compensator 830 may determine the compensation coefficient $\beta$ corresponding to the LED brightness level by selecting it from the LUT or by interpolating adjacent compensation coefficients selected from the LUT.

The pixel data compensator 830 may secondarily compensate pixel data (Gained Pix) primarily compensated by applying the first gain, by applying the second gain ($\alpha*-$Diff$+\beta$) as an offset to the primarily compensated pixel data (Gained Pix) (S816), and may supply finally compensated pixel data (Output Pixel=Gained Pix$+\alpha*-$Diff$+\beta$) as an output image (S818).

Figure 9A:
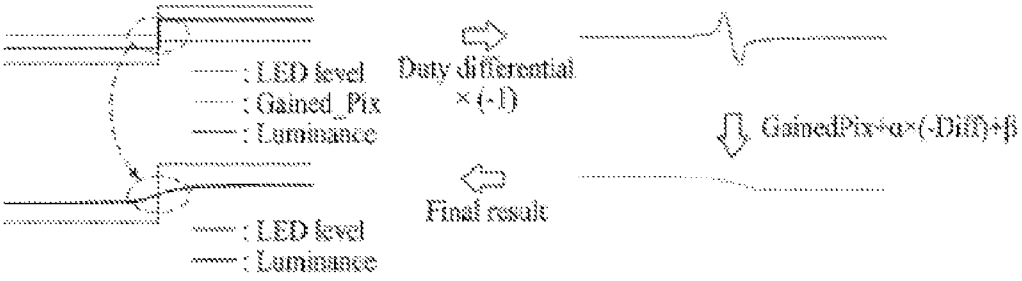
FIGS. 9A and 9B are diagrams illustrating an effect of mitigating a step-like difference between brightness levels of mini LEDs in the liquid crystal display device in accordance with the embodiment.
Figure 9B:
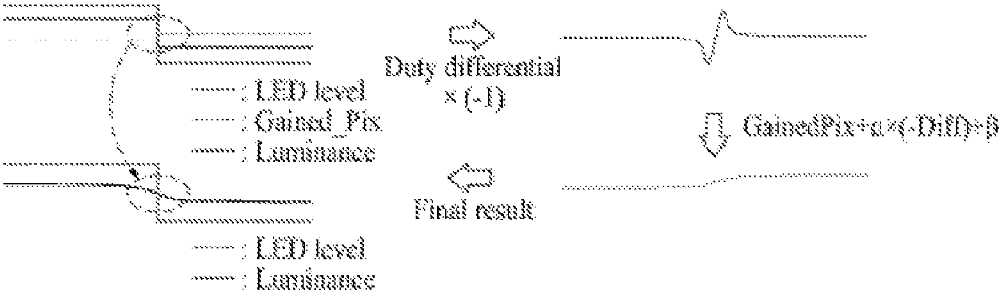

FIGS. 9A and 9B are diagrams illustrating an effect of mitigating a step-like difference between brightness levels of mini LEDs in the liquid crystal display device in accordance with the embodiment.

As shown in FIG. 9A, when LED brightness levels (LED level) between adjacent mini LED elements have a brightness difference increasing in a step-like pattern, due to the fact that the second gain ($\alpha*-$Diff$+\beta$), which is obtained as the weight $\alpha$ and the compensation coefficient $\beta$ according to the LED brightness level (LED level) are applied to the differential value (−Diff) of the LED brightness level (LED level) for each subpixel location, is applied as an offset to the pixel data (Gained Pix) primarily compensated by the first gain according to the LED brightness level (LED level), the primarily compensated pixel data (Gained Pix) may be secondarily compensated. Secondarily compensated pixel data (Output Pixel=Gained Pix$+\alpha*-$Diff$+\beta$) may be supplied as a compensated data signal to each subpixel of the liquid crystal panel. Accordingly, it may be seen that there is an effect that an LED brightness difference increasing in a step-like pattern is mitigated in a perceived luminance according to the combination of the brightness of each mini LED element adjusted according to the LED brightness level of the mini LED element and the light transmittance of each subpixel according to the compensated data signal.

As shown in FIG. 9B, even when LED brightness levels (LED level) between adjacent mini LED elements have a brightness difference decreasing in a step-like pattern, due to the fact that the second gain ($\alpha*-$Diff$+\beta$), which is obtained as the weight $\alpha$ and the compensation coefficient $\beta$ according to the LED brightness level (LED level) are applied to the differential value (−Diff) of the LED brightness level (LED level) for each subpixel location, is applied as an offset to the pixel data (Gained Pix) primarily compensated by the first gain according to the LED brightness level (LED level), the primarily compensated pixel data (Gained Pix) may be secondarily compensated. As the secondarily compensated pixel data (Output Pixel=Gained Pix$+\alpha*-$Diff$+\beta$) is supplied as a compensated data signal to each subpixel of the liquid crystal panel, it may be seen that there is an effect that an LED brightness difference decreasing in a step-like pattern is mitigated in a perceived luminance according to the combination of the brightness of each mini LED element adjusted according to the LED brightness level of the mini LED element and the light transmittance of each subpixel according to the compensated data signal.

As is apparent from the above description, in the liquid crystal display device and the driving method thereof according to an aspect, by primarily compensating pixel data by applying a first gain determined according to the brightness level of each mini LED and by secondarily compensating the primarily compensated pixel data and outputting secondarily compensated pixel data by applying a second gain, which is obtained as a weight (α) and a compensation coefficient (β) according to a difference in brightness level between mini LEDs are applied to a differential value of the brightness level for each subpixel location, it is possible to mitigate a step-like difference in brightness between adjacent mini LEDs and improve the image quality.

The liquid crystal display device according to the embodiment may be applied to various electronic devices. For example, the liquid crystal display device according to the embodiment may be applied to a mobile device, a video phone, a smart watch, a watch phone, a wearable device, a foldable device, a rollable device, a bendable device, a flexible device, a curved device, an electronic notebook, an e-book, a portable multimedia player (PMP), a personal digital assistant (PDA), an MPEG audio layer-3 player, a mobile medical device, a desktop personal computer (PC), a laptop PC, a netbook computer, a workstation, a navigation device, a vehicle navigation device, a vehicle display device, a television, a wallpaper display device, a signage device, a game device, a notebook computer, a monitor, a camera, a camcorder, a home appliance, and the like.

Features, structures, effects, etc. described above in various examples of the present disclosure are included in at least one example of the present disclosure and are not necessarily limited to only one example. Furthermore, features, structures, effects, etc. illustrated in at least one example of the present disclosure may be combined or modified for other examples by those skilled in the art to which the technical idea of the present disclosure pertains. Therefore, the contents related to such combinations and modifications should be interpreted as being included in the technical spirit or scope of the present disclosure.

While the present disclosure described above is not limited to the above-described embodiments and the accompanying drawings, it will be apparent to those skilled in the art to which the present disclosure belongs that various substitutions, modifications, and changes may be made herein without departing from the scope of the present disclosure. Therefore, the scope of the present disclosure is defined by the appended claims, and all changes or modifications derived from the meaning, scope, and equivalence of the claims are to be construed as being included in the scope of the present disclosure.

What is claimed is:

1. A liquid crystal display (LCD) drive device, the LCD drive device comprising:

a panel driver configured to drive a liquid crystal panel;

a backlight driver configured to drive a backlight module including a plurality of light emitting diode (LED) elements; and an image processor configured to, according to a result of analyzing input image data of each frame, determine a brightness level of each LED element and output the determined brightness level to the backlight driver, and compensate a first pixel data of each subpixel according to the brightness level of each LED element, wherein the image processor generates second pixel data by applying a first gain, determined according to the brightness level of each LED element, to the first pixel data of each subpixel, wherein the image processor calculates a second gain by using at least one of:

a differential value obtained by differentiating the brightness level of each LED element for a location of each subpixel, a weight determined according to the brightness level of each LED element, or a compensation coefficient determined according to the brightness level of each LED element, and wherein the image processor generates third pixel data by applying the second gain to the second pixel data and outputs the third pixel data to the panel driver, wherein the image processor comprises:

an image analyzer configured to divide the input image data of each frame into the plurality of unit areas, and output an image analysis result of each unit area obtained by analyzing image characteristics of each of the plurality of unit areas;

an LED brightness level determiner configured to determine and output the brightness level of each LED element corresponding to each unit area according to the image analysis result of each unit area; and a pixel data compensator configured to determine the first gain and the second gain according to the brightness level of each LED element, generate the second pixel data by applying the first gain to the first pixel data of each subpixel, and generate the third pixel data by applying the second gain as an offset value to the second pixel data.

2. The LCD drive device according to claim 1, wherein the image analyzer calculates an average value or a maximum value of the first pixel data of each unit area as the image analysis result of each unit area, or calculates the image analysis result of each unit area by using a distribution of the first pixel data of each unit area.

3. The LCD drive device according to claim 1, wherein the pixel data compensator calculates the first gain which is inversely proportional to the brightness level of the LED element, and generates the second pixel data by multiplying the calculated first gain and the first pixel data of each subpixel.

4. The LCD drive device according to claim 1, wherein the pixel data compensator determines an LED brightness level of each of the plurality of subpixels by applying the brightness level of each LED element to each unit area, and the pixel data compensator calculates the differential value of the LED brightness level for the location of each subpixel, by convoluting the LED brightness level of each of the plurality of subpixels and a plurality of mask coefficients of a Gaussian Laplacian mask.

5. The LCD drive device according to claim 4, wherein the pixel data compensator determines the weight which is inversely proportional to the brightness level of each LED element and the compensation coefficient according to the brightness level of each LED element to compensate for a deviation from a measures luminance, and the pixel data compensator calculates the second gain by applying the weight and the compensation coefficient to the differential value of the LED brightness level for the location of each subpixel.

6. The LCD drive device according to claim 1, wherein the pixel data compensator calculates the second gain by multiplying the differential value of the LED brightness level for the location of each subpixel by the weight and adding the compensation coefficient, and the pixel data compensator generates the third pixel data by summing the second pixel data and the second gain.

7. The LCD drive device according to claim 6, wherein the pixel data compensator calculates an amount of change in LED brightness level for each location with respect to adjacent subpixels at the location of each subpixel, as the differential value, by convoluting the mask coefficients of an N*N size (N is a positive integer) and the LED brightness level of each of subpixels of the N*N size.

8. An electronic device, the electronic device comprising:

a light emitting diode (LED) array in which at least one LED element is disposed in a form of a matrix to face a display area;

an image processor configured to:

determine a brightness level of each of the at least one LED element by reflecting an image analysis result, primarily compensate at least one pixel data based on the brightness level of each of the at least one LED element, secondarily compensate the at least one pixel data based on an amount of change in the brightness level between adjacent subpixels, output the at least one pixel data being compensated secondarily; and a timing controller configured to receive the at least one pixel data being compensated secondarily and a synchronization signal, wherein the synchronization signal includes at least one of a dot clock, a data enable signal, a vertical synchronization signal or a horizontal synchronization signal, wherein the image processor comprises:

an image analyzer configured to divide input image data of each frame into a plurality of unit areas of the display area, and output an image analysis result of each unit area obtained by analyzing image characteristics of each of the plurality of unit areas;

an LED brightness level determiner configured to determine and output the brightness level of each LED element corresponding to each unit area according to the image analysis result; and a pixel data compensator configured to determine a first gain and a second gain according to the brightness level of each LED element, generate a second pixel data by applying the first gain to the first pixel data of each subpixel, and generate a third pixel data by applying the second gain as an offset value to the second pixel data.

9. The electronic device of claim 8, wherein the at least one LED element corresponds to at least one subpixel of adjacent subpixels.

10. The electronic device of claim 9, wherein the pixel data compensator is configured to calculate the amount of change in the brightness level by convoluting a mask coefficient of an N*N size and the brightness level of each of the subpixels of the N*N size, further the N is a positive integer.

11. The electronic device of claim 10, wherein the N is 3 or any other constant integer.

12. The electronic device of claim 9, wherein the pixel data compensator is configured to calculate the amount of change in the brightness level by using a differential value.

13. A method for processing data in an electronic device having a light emitting diode (LED) array in which at least one LED element is disposed in a form of a matrix to face a display area, the method comprising:

determining a brightness level of each of the at least one LED element by reflecting an image analysis result;

primarily compensating at least one pixel data based on the brightness level of each of the at least one LED element;

secondarily compensating the at least one pixel data based on an amount of change in LED brightness level between adjacent subpixels; and processing the at least one pixel data being compensated secondarily and a synchronization signal, wherein the synchronization signal includes at least one of a dot clock, a data enable signal, a vertical synchronization signal or a horizontal synchronization signal, wherein the electronic device further comprises an image processor configured to include:

an image analyzer configured to divide input image data of each frame into a plurality of unit areas of the display area, and output an image analysis result of each unit area obtained by analyzing image characteristics of each of the plurality of unit areas;

an LED brightness level determiner configured to determine and output the brightness level of each LED element corresponding to each unit area according to the image analysis result; and a pixel data compensator configured to determine a first gain and a second gain according to the brightness level of each LED element, generate a second pixel data by applying the first gain to the first pixel data of each subpixel, and generate a third pixel data by applying the second gain as an offset value to the second pixel data.

14. The method of claim 13, wherein the at least one LED element corresponds to at least one subpixel of adjacent subpixels.

15. The method of claim 14, wherein the step of secondarily compensating calculates the amount of change in the brightness level by convoluting a mask coefficient of an N*N size and the brightness level of each of the subpixels of the N*N size, further the N is a positive integer.

16. The method of claim 15, wherein the N is 3 or any other constant integer.

17. The method of claim 14, wherein the step of secondarily compensating calculates the amount of change in the brightness level by using a differential value.

18. The method of claim 13, wherein a size of each of the at least one LED element is 100 to 200 μm.

* * * * *